US010627210B2

(12) United States Patent
Habrich

(10) Patent No.: US 10,627,210 B2
(45) Date of Patent: Apr. 21, 2020

(54) MEASURING A CAVITY BY MEANS OF INTERFERENCE SPECTROSCOPY

(71) Applicant: Björn Habrich, Darmstadt (DE)

(72) Inventor: Björn Habrich, Darmstadt (DE)

(*) Notice: Subject to any disclaimer, the term of this patent is extended or adjusted under 35 U.S.C. 154(b) by 0 days.

(21) Appl. No.: 16/078,949

(22) PCT Filed: Feb. 23, 2017

(86) PCT No.: PCT/EP2017/054128
§ 371 (c)(1),
(2) Date: Aug. 22, 2018

(87) PCT Pub. No.: WO2017/144567
PCT Pub. Date: Aug. 31, 2017

(65) Prior Publication Data
US 2019/0056213 A1   Feb. 21, 2019

(30) Foreign Application Priority Data

Feb. 23, 2016 (DE) .................. 10 2016 103 109

(51) Int. Cl.
*G01B 9/02* (2006.01)
*G01S 17/32* (2020.01)
(Continued)

(52) U.S. Cl.
CPC ....... *G01B 9/02004* (2013.01); *G01B 9/0207* (2013.01); *G01B 9/02057* (2013.01);
(Continued)

(58) Field of Classification Search
CPC .. G01B 9/02004; G01B 11/14; G01B 9/0207; G01B 9/02083; G01B 11/02;
(Continued)

(56) References Cited

U.S. PATENT DOCUMENTS 5,956,355 A * 9/1999 Swanson ............ A61B 1/00183
                                                            356/479
2002/0109851 A1* 8/2002 Deck ...................... G01B 11/06
                                                            356/512
(Continued)

FOREIGN PATENT DOCUMENTS

EP        2175228 A1    4/2010
JP     2012-184967 A    9/2012

OTHER PUBLICATIONS

Coe, P. A., D. F. Howell, and R. B. Nickerson. "Frequency scanning interferometry in ATLAS: remote, multiple, simultaneous and precise distance measurements in a hostile environment." Measurement Science and Technology 15.11 (2004): 2175. (Year: 2004).*

(Continued)

*Primary Examiner* — Dominic J Bologna
(74) *Attorney, Agent, or Firm* — McDermott Will & Emery LLP

(57) ABSTRACT

A method for interferometrically determining geometric and/or optical parameters of a cavity comprises the method steps of: tuning the frequency f of a coherent light source (10) over a frequency range Δf, deriving a target beam and a reference beam from the coherent light source (10), wherein the target beam passes through the cavity at least once, generating an interference signal I(f) which is dependent on the frequency f of the light source by superimposing the reference beam on the target beam, capturing an interference spectrum of the interference signal I(f) over the frequency range Δf of the frequency f of the coherent light source, evaluating a plurality of measurement points of the captured interference spectrum over the frequency range Δf by numerically fitting the measurement points to a mathematical function produced, and determining the geometric and/or optical parameters of the cavity (40, 45) by deter- (Continued)

mining the parameters of the mathematical function produced.

24 Claims, 4 Drawing Sheets

(51) Int. Cl.
  *G01B 11/02*   (2006.01)
  *G01B 11/14*   (2006.01)
  *G01N 21/41*   (2006.01)
  *G01N 21/45*   (2006.01)

(52) U.S. Cl.
  CPC .......... *G01B 9/02083* (2013.01); *G01B 11/02* (2013.01); *G01B 11/14* (2013.01); *G01N 21/4133* (2013.01); *G01N 21/45* (2013.01); *G01S 17/325* (2013.01); *G01B 2290/60* (2013.01)

(58) Field of Classification Search
  CPC ............ G01B 9/02057; G01B 2290/60; G01N 21/45; G01N 21/4133; G01S 17/325
  See application file for complete search history.

(56) References Cited

U.S. PATENT DOCUMENTS

2003/0160968 A1\* 8/2003 Deck .................. G01B 11/06
                  356/515
2011/0176143 A1\* 7/2011 Djupsjobacka .... G01B 9/02028
                  356/480

OTHER PUBLICATIONS

Knight, P. Douglas, Alvaro Cruz-Cabrera, and Brent C. Bergner. "High-resolution measurement of the free spectral range of an etalon." Electro-Optical System Design, Simulation, Testing, and Training. vol. 4772. International Society for Optics and Photonics, 2002. (Year: 2002).\*

Kang, Chul-moo, et al. "Inspection system for microelectronics BGA package using wavelength scanning interferometry." Optomechatronic Systems II. vol. 4564. International Society for Optics and Photonics, 2001. (Year: 2001).\*

International Search Report and Written Opinion dated Apr. 24, 2017 in International (PCT) Application No. PCT/EP2017/054128, English translation of ISR only.

Coe, P.A., et al. "Frequency Scanning interferometry in ATLAS: remote, multiple, simultaneous and precise distance measurements in a hostile environment", Measurement Science and Technology, vol. 15, No. 11, pp. 2175-2187, Sep. 30, 2004.

Kang, C.M., et al. "Inspection system for microelectronics BGA package using wavelength scanning interferometry" Optomechatronic Systems II, Proceedings of SPIE, vol. 4564, p. 74, Oct. 4, 2001.

Knight, P. Douglas, et al. "High-resolution measurement of the free spectral range of an etalon", Proceedings of SPIE, vol. 4772, p. 114, Oct. 1, 2002.

International Preliminary Report on Patentability dated Aug. 28, 2018 in International (PCT) Application No. PCT/EP2017/054128, English translation, 9 pages.

\* cited by examiner

MEASURING A CAVITY BY MEANS OF INTERFERENCE SPECTROSCOPY

RELATED APPLICATIONS

This application is a United States National Phase under 35 U.S.C. § 371 of International Application No. PCT/EP2017/054128, filed on Feb. 23, 2017, which claims priority to German Patent Application No. 10 2016 103 109.7, filed Feb. 23, 2016, both of which are hereby incorporated by reference in their entirety for all purposes.

FIELD OF THE INVENTION

The invention concerns a method and a device for interferometric measurement of the various optical and mechanical parameters of a cavity, in particular its length.

BACKGROUND TO THE INVENTION

Every interferometer relies on the principle of superimposing an internal reference beam on a coherent light beam reflected from the target and analysing the resulting interference signal.

The interference signal changes in different ways, depending on which parameters of the cavity change. In the case of length changes of the interferometer (of the cavity) or due to wavelength changes of the coherent light source, there is a sweep-through of the phase of the periodic (sine- or cosine-shaped) interference signal. The speed of this phase change is proportional to the speed of a length change of the cavity or the speed of a wavelength change of the light source multiplied by the current length of the cavity. In the case of changes to other optical parameters of the cavity, e.g. the contrast or the amplitude of the interference signal change.

From patent application EP 2 363 685 A1 there is known a device and a method for interferometric position acquisition, which exhibits a Fabry-Perot interferometer. By measuring the intensity of the light reflected from the mirrors of the Fabry-Perot interferometer it is possible to ascertain the mirror separation and/or a change in the mirror separation. Since the wavelength λ of the measurement light is known, it is possible to determine the change in the length of the resonator of the Fabry-Perot interferometer from a measurement of the intensity of the reflected light.

Methods for distance measurement such as the one described in EP 2 363 685 A1 attempt to keep the wavelength known and constant, so that an unambiguous inference from changes in the sinusoidal interference pattern to length changes of the cavity and thus changes in the distance of an object is possible (see also FIG. 1 and FIG. 2 in EP 2 363 685 A1).

It is problematic here that it requires great investment in resources to calibrate the wavelength and keep it constant. In addition a problem arises in the vicinity of the extreme points of the sinus, since there the dependence of the signal on the movement of the object is weaker. At the extreme points themselves it is only of second order and thus makes the signal ambiguous. Furthermore one cannot distinguish in this manner between changes in the length of the cavity and changes in other optical parameters such as, for example, the reflectivity and/or the index of refraction.

Two possibilities have been proposed and realised in the state of the art for solving part of these problems:

If several light sources (preferably lasers) with different wavelengths are used simultaneously, the problem of the extreme points occurs only very rarely in all light sources simultaneously. Thus they can be used alternately for measurement. Several lasers, however, mean at the same time greatly increased investment in resources and thus increased costs.

Through high-frequency modulation of the wavelength of the tuneable lasers at a small amplitude, which in effect corresponds to a small movement of the target, in addition to the interference signal its approximated first derivative by position is measured. This is complementary to the direct signal in the sense that its strongest dependence on the position exists exactly where the direct signal is insensitive—and vice versa. Together they always yield an analysable signal. Since the 'derivation' is based on forming a difference, however, it amplifies the noise of the interference signal considerably.

The disadvantage of these possibilities, then, is that they either increase the investment in resources and/or utilise further information that suffers from additional measurement inaccuracy. Furthermore in this method it is not possible or possible only with great difficulty to infer from a change in the interference signal directly to a change in the length of the cavity. Optical conditions could also always have changed, which then lead to an error in the length measurement. A further problem is that in the case of a still-standing object and a fixedly adjusted wavelength, the interference signal also hardly changes and therefore a very high sensitivity to disturbances exists.

The task of this invention, therefore, is to create a method and a device for interferometric distance measurement which solve the problems known from the state of the art, implement them at a comparatively low investment in resources and in particular make possible the highest possible measurement accuracy.

SUMMARY OF THE INVENTION

According to the invention, this task is solved through a method for interferometric determination of the geometric and/or optical parameters of a cavity, exhibiting the method steps: tuning the frequency f of a coherent light source over a frequency range Δf, derivation of a target beam and a reference beam from the coherent light source, where the target beam traverses the cavity at least once, generation of an interference signal I(f) that depends on the frequency f of the light source by superimposing the reference beam on the target beam, acquisition of an interference spectrum of the interference signal I(f) over the frequency range Δf of the frequency f of the coherent light source, analysis of a large number of measurement points of the acquired interference spectrum over the frequency range Δf through numerical fit of the measurement points to a generated mathematical function, and determination of the geometric and/or optical parameters of the cavity (40, 45) by ascertaining the parameters of the generated mathematical function.

The invention further proposes a device for interferometric determination of the geometric and/or optical parameters of a cavity, exhibiting: a tuneable coherent light source, a beam splitter for splitting the light emitted by the coherent light source into a target beam and a reference beam, a first optical coupler for coupling the target beam into a target interferometer that is bounded by the optical coupler and an object, a detector for frequency-resolved detection of an interference signal I(f) generated by superimposing the reference beam on the target beam and for acquisition of an interference spectrum of the interference signal I(f) over the frequency range Δf of the frequency f of the coherent light source, an analysing unit configured for analysing a large number of measurement points of the acquired interference spectrum over the frequency range Δf through numerical fit of the measurement points to a generated mathematical function, and for determining the geometric and/or optical parameters of the cavity (40, 45) by ascertaining the parameters of the generated mathematical function.

According to the invention, then, an interference spectrum I(f) is recorded with the greatest possible speed, accuracy and width, i.e. a non-local image of the frequency-dependent interference signal of the light source is analysed and through its mathematical analysis an inference is made about the mechanical and/or geometric and the optical parameters of the cavity.

No movement of the object is needed here in order to analyse the measured values. For a pure distance measurement (length and/or change in length of the cavity) the recorded interference spectrum is analysed in respect of its periodicity. It contains, however, significantly more information, which can be utilised for the observation of optical parameters of the interferometer. For example, a possibly variable reflectivity can be inferred from the amplitude, in order to readjust the power of the laser and/or the reflectivity of the reference beam. Another example is the measurement of the dispersion (as long as it is large enough) of the medium in the cavity with the help of a comparison of the measured distances from different parts of the sweep or in comparison with the interference spectrum from a reference cavity in which each of the other parameters (e.g. its length) are constant.

The analysis of the interference signal I(f) can take place through a numerical fit to a sine function, whereby the amplitude and phase of the interference signal I(f) are determined. The more measured values that are available, the more accurately can the numerical fit be matched to the theoretical curve shape of the interference signal and the more precisely the sought parameters be extracted. In this manner, distortions of the signal as a function of the frequency can also be investigated, whereby one can also extract optical parameters that are a function of the wavelength of the coherent light source.

The analysed frequency range Δf can be adjusted for the various measurements. For an analysis of amplitude and phase for determining the length of the cavity, preferably a phase of at least 180°, in particular about 360° of the interference signal I(f) is used here, so that possible distortions do not worsen the quality of the numerical fit. If, rather, the measurements involve wavelength-dependent measurands, the analysed frequency range should rather be chosen to be as large as possible, so that these distortions can be analysed better as a function of the wavelength.

Many mathematical methods offer themselves for the numerical fit, for example standard methods such as the method of least squares, the Levenberg-Marquardt algorithm or a lock-in method with synthetic reference. The presented method is suitable for diverse applications for distance measurement. In particular, the application cases are relevant in which the length x that is to be determined is formed by the length of a target interferometer that is bounded by an optical coupler and a moving object.

The method according to the invention can be supplemented by a step for calibrating with high accuracy the frequency f of the light source 10 by using the known frequency $f_R$ of a particular absorption line of an absorption material.

This frequency calibration can take place in particular through a numerical fit to the frequency $f_R$ of the absorption line of the absorption material. Alternatively or in addition, it can be advantageous to calibrate the frequency f of the coherent light source by using a reference interferometer 60 of known length.

The frequency f of the coherent light source is tuned cyclically. In each cycle, the frequency of the laser is tuned uniformly from a start- to a target-value (frequency sweep). This frequency tuning can preferably take place linearly, for example by having the relationship between the frequency and the directly influenceable electronic controlled variable stored in a lookup table. This lookup table can also be dynamically recalibrated during the measurement. A uniform distribution of the measurement points over the observed range increases the accuracy of the analysis, in particular the quality of the fit and of the resulting fit parameters.

The method according to the invention can in addition be supplemented by the method step of a rough measurement of the length x by counting out the traversed periods of the interference signal I(f). For the rough measurement there suffices a heuristic method, which only has to count along unambiguously the traversed periods in both directions during the frequency sweep.

The tuning of the frequency f of the coherent light source can take place thermally by means of temperature control, electrically through regulation of a control current or mechanically by changing the length of the cavity of the light source.

The method according to the invention additionally allows the traversed frequency range Δf of the coherent light source to be chosen as a function of the speed and of the distance of the moving object.

A laser diode, in particular a DFB laser diode, can be used as a tuneable coherent light source 10.

In the device according to the invention, the target interferometer can for example be configured as a Fabry-Perot interferometer or as a Michelson interferometer.

Moreover, the device can comprise a detector (32) for determining the amplitude of the intensity of the reference beam during the course of a measurement cycle. Since the intensity of the light emitted by the tuneable light source can fluctuate during the course of a measurement cycle, the analysis is made more difficult. In this respect it is advantageous to divide the interference signal by the simultaneously measured intensity of the reference beam and thus to normalise it.

DESCRIPTION OF FIGURES

The invention is described below in detail with the aid of embodiment examples by reference to the drawings. The figures show.

DETAILED DESCRIPTION OF EMBODIMENT EXAMPLES

Figure 1:
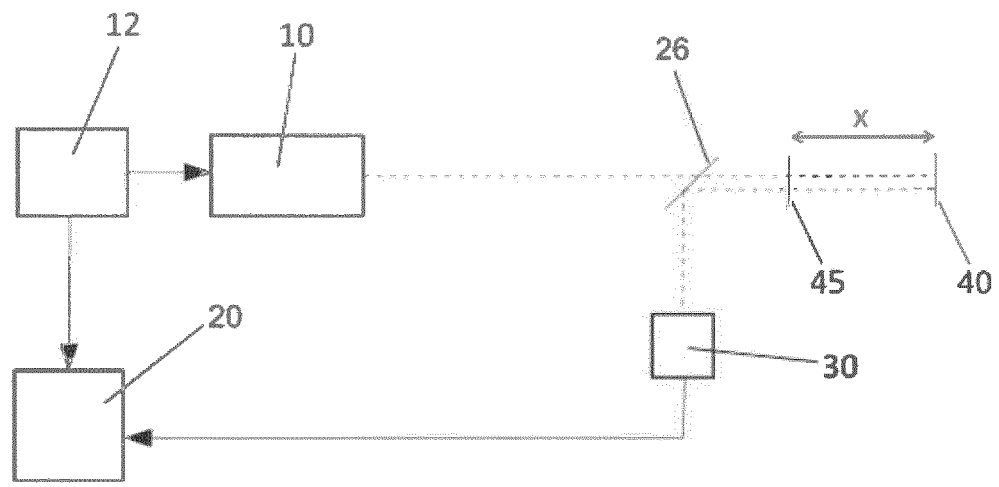
FIG. 1 A schematic representation of a first embodiment example of the device according to the invention for the interferometric determination of the geometric and optical properties of a cavity, FIG. 2 A schematic representation of a second embodiment example of the device according to the invention for the interferometric determination of the geometric and optical properties of a cavity, FIG. 3 A schematic representation of a third embodiment example of the device according to the invention for the interferometric determination of the geometric and optical properties of a cavity, FIG. 4 A schematic representation of a fourth embodiment example of the device according to the invention for the interferometric determination of the geometric and optical properties of a cavity, FIG. 5 A schematic representation of a fifth embodiment example of the device according to the invention for the interferometric determination of the mechanical and optical properties of a cavity, FIG. 6 A schematic representation of the interference spectrum of an interference signal acquired at the detector in accordance with an embodiment example of the method according to the invention, and FIG. 7 A schematic representation of the absorption spectrum of a light beam radiated by the light source at a gas cell filled with an absorption medium in accordance with an embodiment example of the method according to the invention.

FIG. 1 shows a schematic representation of a first embodiment example of a device according to the invention for the interferometric determination of the mechanical/geometric and the optical properties of a cavity. Here, as in the following illustrations, the basic principle of the construction of the device is shown. Appliances for calibration, power supply, temperature control etc are not shown, nor are optical ancillary appliances such as apertures, collimators etc. For better understanding, moreover, the emitted and incident beams are shown in the drawings next to each other. In fact, however, usually these beams are not separated geometrically.

A tuneable laser, e.g. a DFB laser diode, which preferably radiates visible or infrared light, serves in the shown embodiment examples as a coherent light source 10 for beam generation. A modulation unit 12 is envisaged for frequency tuning. The tuning here can take place e.g. thermally by means of temperature control, electrically by regulating the control current or mechanically by changing the size of the cavity 40, 45 in the laser diode, and has as a consequence that the phase of the sinusoidal interference signal varies in analogy with genuine movement. For frequency stabilisation the light source 10 is located preferably in a cell (not shown) with controlled ambient conditions, in particular with regulated temperature.

The beam emitted by the coherent light source 10 is split by the semi-transparent mirror 26 into an internally reflected fraction, which is directly incident on the detector 30, and a transmitted fraction which traverses twice the length x to be measured, i.e. a cavity in the form of a Fabry-Perot type interferometer between the optical coupler 45 and a reflecting moveable object 40. These two part-beams are superimposed at the optical coupler 45 and generate the interference signal at the detector 30. The manner of producing the interference is not crucial for the function according to the invention; other types of interferometer, e.g. Michelson, are also suitable.

The modulation unit 12 controls the wavelength cycle of the light source 10 and at the same time passes its signal on to an analysing unit 20, which calculates the result from this and from the received interference signal from the detector 30. The signal analysis is explained in detail further below.

Figure 2:
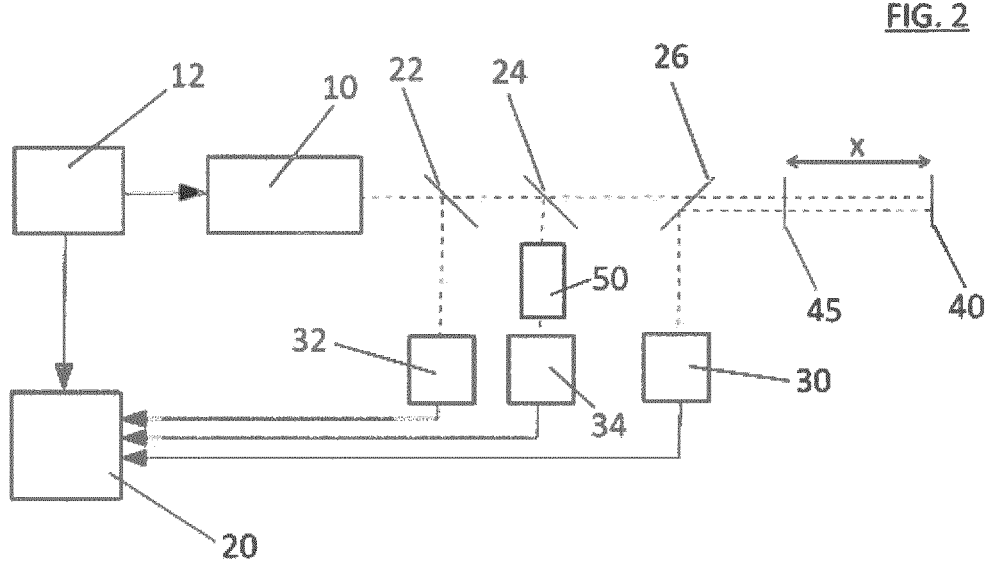

FIG. 2 shows a schematic representation of a second embodiment example of a device according to the invention for interferometric determination of the mechanical/geometric and the optical properties of a cavity. In contrast with the embodiment example shown in FIG. 1, this one exhibits additionally a semi-transparent mirror 22 at which a part-beam is branched off to a detector 32, which determines a reference intensity, in order to acquire and to take into consideration in the analysis possible intensity changes of the light source during the course of a measurement cycle. A further semi-transparent mirror 24 directs a part-beam onto a gas cell 50, which is filled with a preferably gaseous absorption material with a sharp absorption line. The absorption is acquired by the detector 34 and allows calibration of the frequency of the light source 10 with high accuracy.

Figure 3:
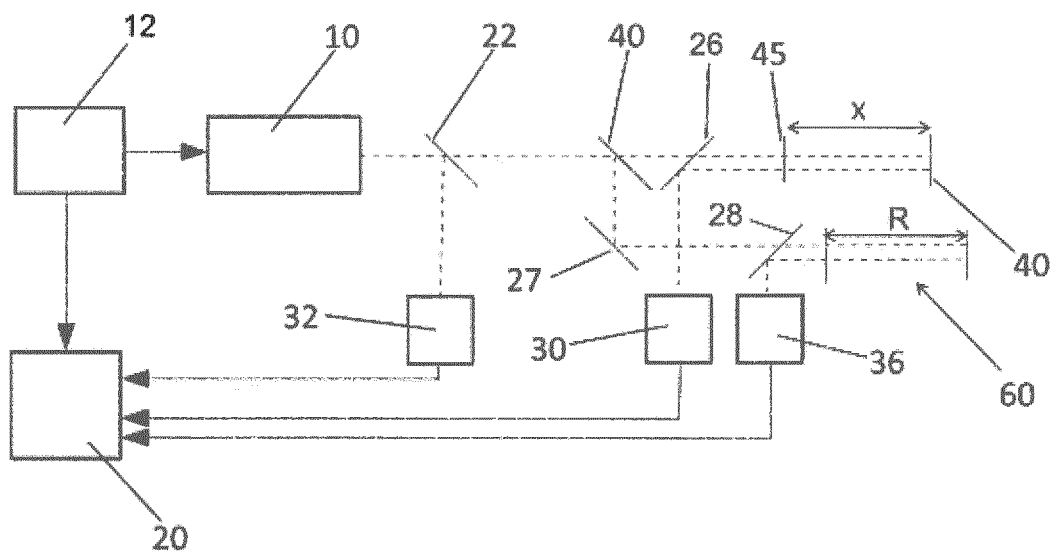

FIG. 3 shows a schematic representation of a further embodiment example of a device according to the invention for interferometric determination of the mechanical/geometric and the optical properties of a cavity. The gas cell 50 envisaged in the embodiment example of FIG. 2 is here replaced by a reference interferometer 60 with accurately known length R and associated detector 36 and semi-transparent mirror 28. The signal acquired at the detector 36 can be used to ensure and/or to reconstruct the linearity of the frequency sweep over the light frequency.

Figure 4:
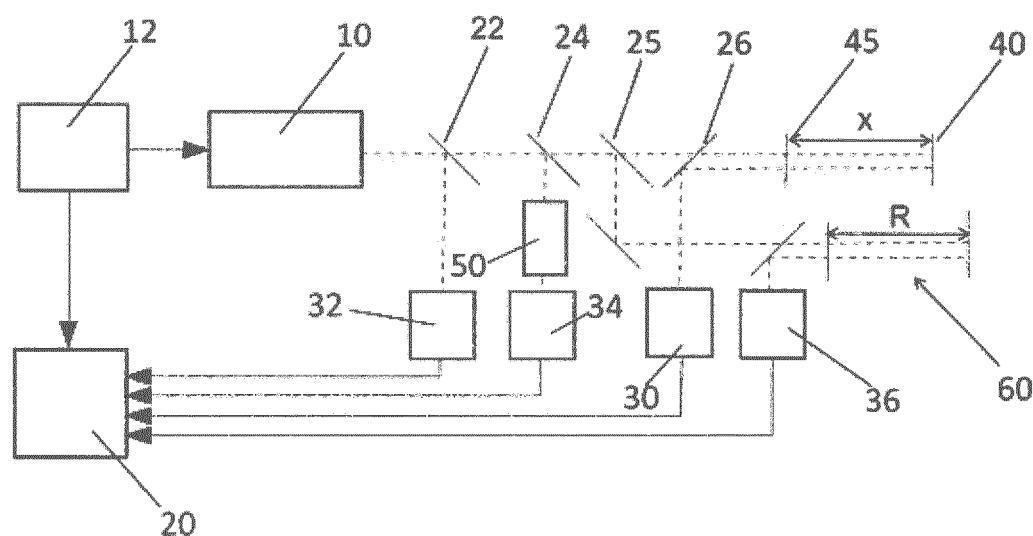

FIG. 4 shows a schematic representation of a fourth embodiment example of a device according to the invention for interferometric determination of the mechanical/geometric and the optical properties of a cavity, where both a gas cell 50—as explained in connection with FIG. 2—and a reference interferometer 60 in accordance with FIG. 3 are envisaged.

Figure 5:
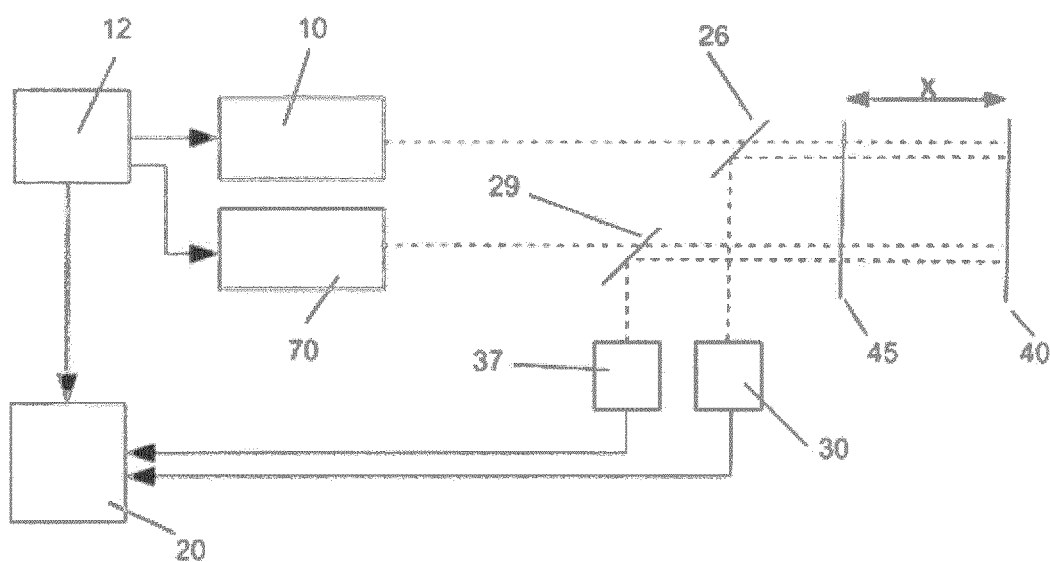

FIG. 5 shows a schematic representation of a fifth embodiment example of a device according to the invention for interferometric determination of the mechanical/geometric and optical properties of a cavity, where a second laser 70 with associated semi-transparent mirror 29 for decoupling of the light beam radiated by the second laser 70 plus a further detector 37 for the acquisition of an interference signal are envisaged. Through the second laser 70 a wide interference spectrum can be covered, if a single laser cannot be tuned widely enough or rapidly enough. For covering the greatest possible range of frequencies, that is, the widest possible interference spectrum, several lasers can also be utilised. Particularly in measurements of the often very small dispersion (dependence on the index of refraction of f), by using several lasers one can cover a large range of wavelengths and at the same time also put up with gaps in the spectrum. To this end, one would drive the different lasers alternately and therefore does not have to carry out separation of the signals during the analysis. However one can also, with several lasers in parallel, record and correlate with each other several interference spectra at different interesting working points, for which the lasers would be modulated at different frequencies or differ enough in their wavelength such that during the analysis one can separate them again.

In the following, the recording of readings performed at analysing unit 20 and the subsequent processing of readings are explained in detail.

Figure 6:
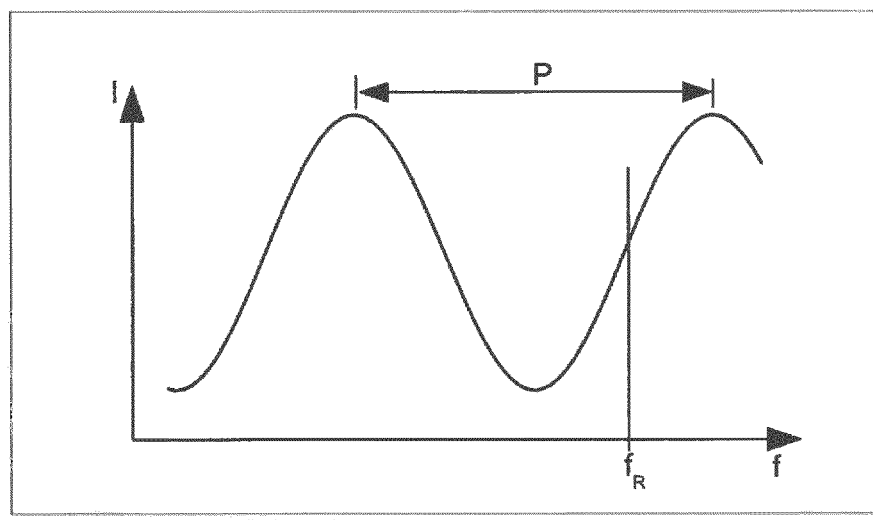

In each cycle, the wavelength of the laser is changed uniformly from a start- to a target-value (wavelength sweep) and the relevant interference signal intensity I as a function of the frequency f acquired, as shown schematically in FIG. 6. For practical reasons this would normally happen in alternating directions. It is not crucial to know the start and end values exactly.

If a gas cell 50 (see FIGS. 2 and 4) is used as reference, now and then one of its absorption lines has to be scanned across for calibration purposes. Normally it will not be possible to adjust the laser wavelength in isolation. In the DFB laser, for example, this is always associated with a change in intensity also. This can be taken into account in the analysis by acquiring a reference intensity at the detector 32 (see FIGS. 2-4). During the sweep, the generated signals are recorded with a large number of individual measurements. By means of electronics, they are correlated with the sweep and made available for analysis at the analysing unit 20.

For the analysis, the readings have to be correlated with the light frequency of the laser $f=c/\lambda$. The relationship between f and $\lambda$, therefore, is non-linear, and $\lambda$ depends via characteristic curves of the laser and the electronics on the directly influenceable electronic controlled variable S (normally the input value of a D/A converter). Therefore, a sweep without corrections can give rise to a non-uniform change in f. There are several possibilities for solving this problem:

- The sweep itself is linearised. To this end a lookup table is stored, which influences the sequence of steps when changing the controlled variable S
- The recording of readings is coupled to S in such a way that readings are recorded in uniform f-steps
- The non-uniform interval of the readings over f is compensated for during the analysis.

All methods require that the dependence f(S) be ascertained and from it a suitable lookup table be calculated each time. To this end a reference cavity 60 of known and fixed length R (see FIGS. 3 and 4) is used, over which the sweep is performed. It depends on the stability of the utilised laser 10 whether this calibration is carried out preferably once during the production of the instrument, cyclically at greater intervals or at each measurement.

As shown in FIGS. 1-4, the directly reflected wave and the wave returning from the cavity (40, 45) interfere directly before the optical coupler 45. The signal at the detector 30, therefore, has the form $I = A + B \cos \Phi$ The coefficients A, B depend only very weakly on the wavelength, but are proportional to the intensity of the laser. Since the intensity is not necessarily constant over a measurement cycle, this makes the analysis harder, although A and B themselves are not of interest. The problem is solved by dividing the interference signal by the intensity measured simultaneously at the detector 32 (see FIGS. 2-4). Thus, A and B can be regarded as constant during the cycle. The absolute phase difference between the two light beams $\Phi$ as a function of the wavelength is then:

$$\Phi = 2\pi \frac{x}{\lambda} = 2\pi \frac{fx}{c}$$

where
- $\Phi$: Absolute phase difference between the two light beams
- x: Path length of the light in the cavity (with all reflections)
- $\lambda$: Wavelength of the light
- f: Frequency of the light, and
- c: Speed of light With a constant x, this function is periodic over f with the period c/x. However, the individual measurements of a sweep are not conducted simultaneously, between them x can change. It is assumed that the sweep proceeds temporally linearly in f, $f(t) = f_0 + w\,t$, or is linearised subsequently. Constant speed of the object $x = x_0 + v\,t$ is regarded here as the normal case, the role of the acceleration will be discussed later. Then one can plot $\Phi$ against f:

$$\Phi(f) = \Phi_0 + \frac{2\pi}{c} f\left(x_0 + f_0 \frac{v}{w}\right) \quad (\Phi_0 = \text{constant with respect to } f)$$

The interference spectrum is shown in FIG. 5 and thus periodic over f with the period $$P = \frac{c}{x_0 + f_0 v/w}.$$

The phase value of the curve shown should be determined especially accurately at the location of the reference frequency $f_R$. To this end, this location itself is first identified as accurately as possible.

Figure 7:
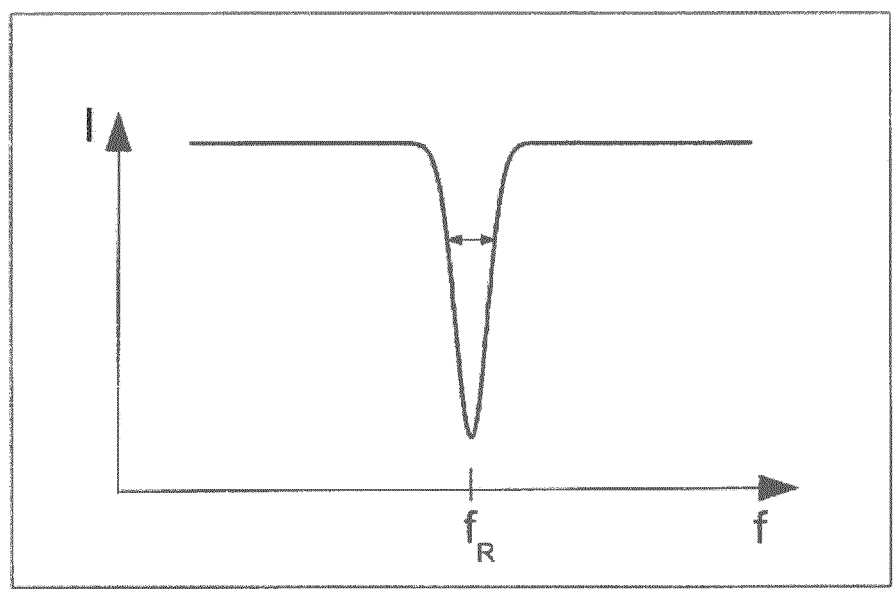

When using a gas cell, the signal of the wavelength reference is measured for this purpose at the detector at the same time as the interference amplitude (FIGS. 2 and 4). Due to the sharp absorption lines of the gas cell, the signal forms in the vicinity of $f_R$ a sharp negative peak with a typical width of ca. 0.1 pm, as shown schematically in FIG. 7. The shape of the peak can be well modelled, because it is induced mainly by Doppler spread (Gaussian profile). By means of a fit of the measured peak to the theoretical shape, $f_R$ can thus be determined even considerably more accurately than the line width indicates. If no gas cell is present, the location of the reference frequency is determined from the (e.g. calibrated at the factory) controlled variable of the laser 10 or from an alternative reference.

When measuring the phase at the point $f_R$, two components act together:

(i) A rough measurement counts the completely traversed periods. This involves a relative measurement, which at the first traverse of the point $f_R$ starts with the value 0. From here on, the periods of the signal are balanced off, taking into account the direction of traverse. At the next traverse through $f_R$, the value is adopted as summand in the phase calculation and the count starts anew. For the rough measurement a heuristic method (known per se to the person skilled in the art) is sufficient. An upper boundary for the target speed arises from the requirement that between two measurements no periods may be traversed unnoticed.

(ii) For exact relative measurement of the length x, in addition to the rough reading the entire scanned-across range of the interference spectrum is used ('fine measurement'). In the sense of a fit, parameters of a sine function (offset, amplitude, frequency, starting phase) are ascertained which reproduce optimally the measured data; the phase of this sine at the location $f_R$ is the result. For a concrete embodiment, several mathematical methods are suitable which can be selected according to practicality in the implementation:

- Numerical optimisation, e.g. Levenberg-Marquardt algorithm.
- Ascertaining the frequency and phase by means of lock-in with synthetic reference (in the manner of a PLL); offset and amplitude are not needed
- Heuristically ascertaining all the parameters from the extrema of the readings The following properties of the method are crucial:
- To determine the phase, all (or at least as many as possible) readings of a sweep are used, which contributes to noise suppression
- Each cycle can be analysed by itself, independently from drift-susceptible calibration data The resolution of the phase measurement increases, naturally, with the density of the readings around $f_R$. On the other hand, the described fit methods require a segment of the function that allows the periodicity to be recognised. From this perspective, it is optimal if the individual measurements represent at least a half-period, preferably exactly one period of the function I(f).

The position change is ascertained from a comparison between two consecutive phase measurements:

$$\Delta x = \lambda_R \frac{\Delta \Phi}{2\pi}$$

where $\lambda_R = c/f_R$ is the reference wavelength.

The influence of a speed and/or acceleration of the object 40 and the temporal change in the sought length x resulting therefrom are discussed in the following.

As derived above, the recording of readings yields a curve Φ over f, which is periodic with the period P:

$$P = \frac{c}{x + fv/w} \text{ Or } P = \frac{c}{x} \frac{1}{1 + \frac{f}{\Delta f} \frac{\Delta x}{x}}.$$

where:
f: Frequency of light; starting value of the sweep
x: Light path length in the cavity at the start of the sweep
v: Rate of change of x
w: rate of change of f
c: Speed of light
Δx: Change in x during one measurement cycle
Δf: Change in f during one measurement cycle The measurement method described above functions best if the f-sweep covers at least ca. one period of this curve, i.e. |Δf|>|P|. x and f are always positive, v and w can however take on different (relative) signs. Due to this the denominator can vanish. The singularity lies at $$\frac{\Delta f}{f} = -\frac{\Delta x}{x}.$$

At this location, the changes in x and f cancel out, such that the interference signal becomes constant.

In the vicinity of the singularity, the condition can no longer be satisfied and the fine measurement becomes inaccurate or impossible. To the right and left of the singularity there are two regions in which the condition can be fulfilled. The condition for Δf can be derived from |Δf|>|P| (let Δf be positive without loss of generality) and represented in the following table:

| Case | Positive denominator | Negative denominator |
|---|---|---|
| Clear classification | Δf and Δx are in the same direction or Δf so large that it over-compensated for the movement in x. | Δf and Δx are in opposite directions and Δf is so small that it does not equalise the movement in x. |
| Requirement for Δf | $\frac{\Delta f}{f} \geq \frac{c}{xf} - \frac{\Delta x}{x} = \frac{\lambda - \Delta x}{x}$ | $\frac{\Delta f}{f} \leq -\frac{c}{xf} - \frac{\Delta x}{x} = -\frac{\lambda + \Delta x}{x}$ |

| Case | Positive denominator | Negative denominator |
|---|---|---|
| Speed limit | $\frac{\Delta x}{\lambda} > 1 - \frac{x}{\lambda} \frac{\Delta f_{max}}{f}$ | $\frac{\Delta x}{\lambda} < -1$ |
| Interpretation | $\Delta f_{max}$ is the laser-dependent maximum sweep amplitude. The equation sets a limit for the speed in the case of movement in opposite directions (Δx negative). For movement in the same direction and x not too small, it is easy to fulfil. | If the opposite-direction Δx traverses at least one wavelength, it can fulfil the contrast condition by itself. Δf has the wrong sign and can contribute nothing to this. |

The singularity is a complication which can be dealt with in two different ways:
Avoiding it: Δf is chosen to be so large that the case on the left is present in both directions of movement:

$$\frac{\Delta f}{f} \geq \frac{\lambda + |\Delta x|}{x}$$

The maximum target speed is more strongly limited thereby, because the condition in the left column has also to be fulfilled for the movement in the opposite direction:

$$\frac{|\Delta x|}{\lambda} < \frac{x}{\lambda} \frac{\Delta f_{max}}{f} - 1; |v|_{max} = \frac{x}{f} w_{max} - \frac{\lambda}{T_{min}}$$

(T=cycle duration)
Putting up with it: Δf is chosen to be only so large that the period condition is fulfilled in the case of movement in the same direction:

$$\frac{\Delta f}{f} \geq \frac{\lambda - |\Delta x|}{x}.$$

In the case of relatively high speed, in the case of movement in opposite directions the condition of the right-hand column can be fulfilled such that an analysis is possible. Even if this is not the case, the measurement method does not break down, since the coarse measurement can continue such that the next cycle can again yield a valid result. The maximum target speed is not restricted except by the condition that the coarse measurement is not allowed to lose any periods: |v|/F<λ/2 (F: sample frequency).

In the case of constant target speed, the sweep yields a strictly periodic interference spectrum. An acceleration of the target during the sweep (and higher terms) effect a distortion in the form of a fluctuation of the period duration. This impairs the accuracy of the phase measurement, but not the coarse measurement. Thus the reduction in accuracy is not cumulative and vanishes again under quieter movement; therefore it is possible to put up with it.

As seen above, from the static perspective it makes sense to stretch the sweep if possible over one period of the function Φ over f. For the ideal value, the inequalities from the two possibilities of the previous section are used as an equation:

$$\frac{\Delta f}{f} = \frac{\lambda \pm |\Delta x|}{x}$$

The amplitude of the sweep, however, must be defined before its start, since it must proceed at constant speed. This requires a prediction for Δx. Obviously, Δx from the previous cycle is suitable for this. A prediction error should not, however, lead to a situation where appreciably less than one period of the interference spectrum is covered, since otherwise the phase measurement fails and a reading is missed out. A range that is too large is less critical. The problem can be dealt with in two different ways:

It is left to the user to specify a maximum acceleration that is typical for his application. The amplitude is then so chosen that even on the occurrence of this acceleration the region of well functioning phase measurement is not exited from:

$$\frac{\Delta f}{f} = \frac{1}{x}(\lambda \pm |\Delta x| + a_{max}T)$$

The typical acceleration is measured and the sweep range matched to it dynamically. If the prediction 'in the false direction' fails, a reading is left out.

What is claimed is:

1. A method for interferometric determination of at least one of geometric and optical parameters of a cavity, comprising the method steps:
    cyclically tuning a frequency f of a coherent light source over a frequency range Δf in both frequency directions,
    deriving a target beam and a reference beam from the coherent light source, where the target beam traverses the cavity at least once,
    generating an interference signal I(f) that depends on the frequency f of the light source by superimposing the reference beam on the target beam,
    acquiring a periodic interference signal I(f) over at least one period P,
    acquiring an interference spectrum of the periodic interference signal I(f) over the frequency range Δf of the frequency f of the coherent light source,
    analysing a of plurality of measurement points of the acquired interference spectrum over the frequency range Δf through numerical fit of the measurement points to a generated mathematical function, and
    determining at least one of the geometric and optical parameters of the cavity by ascertaining the parameters of the generated mathematical function.

2. The method of claim 1, wherein the geometric parameters of the cavity comprise its length x.

3. The method of claim 1, wherein the optical parameters of the cavity comprise at least one of its reflectivity and index of refraction.

4. The method of claim 1, wherein the generated mathematical function is a sine function, whereby an amplitude and phase of the interference signal I(f) are determined.

5. The method of claim 4, wherein the magnitude of the analysed frequency range Δf is matched dynamically to each of the parameters to be measured and to the cavity to be measured.

6. The method of claim 4, wherein the numerical fit takes place by means of a Levenberg-Marquardt algorithm or by means of a lock-in method with synthetic reference.

7. The method of claim 1, wherein a length x to be determined is formed by a length of a target interferometer that is bounded by an optical coupler and a moving object.

8. The method of claim 7, wherein the frequency range Δf of the coherent light source is chosen in dependence on a speed of a moving object.

9. The method of claim 1, wherein the frequency f of the coherent light source is calibrated by utilising a known frequency $f_R$ of a particular absorption line of an absorption material.

10. The method of claim 9, wherein the frequency calibration takes place through a numerical fit to the frequency $f_R$ of the absorption line of the absorption material.

11. The method of claim 1, wherein the frequency f of the coherent light source is calibrated by utilising a reference interferometer of known length.

12. The method of claim 1, wherein the tuning of the frequency f of the coherent light source takes place linearly in frequency space.

13. The method of claim 1, comprising the method step of a coarse measurement of a length x of the cavity by counting out traversed periods of the interference signal I(f).

14. The method of claim 1, wherein the frequency f of the coherent light source is tuned electrically by regulating a driving current or tuned mechanically by changing a length of the cavity of the light source.

15. A device for interferometric determination of at least one of geometric and optical parameters of a cavity, comprising:
    a tuneable coherent light source,
    a modulation unit for cyclical tuning of the frequency f of the coherent light source over a frequency range Δf in both frequency directions,
    a beam splitter for splitting light emitted by the tuneable coherent light source into a target beam and a reference beam,
    a first optical coupler for coupling the first target beam into a target interferometer, which is bounded by the optical coupler and a moving object and comprises a length x to be determined,
    a detector for frequency-resolved detection of an interference signal I(f) generated through superimposition of the reference beam on the target beam and for acquiring an interference spectrum of the interference signal I(f) over the frequency range Δf,
    an analysing unit configured for acquiring a periodic interference signal I(f) over at least one period P and for acquiring an interference spectrum of the periodic interference signal I(f) over a frequency range Δf in both frequency directions, and for analysing a plurality of measurement points of the acquired interference spectrum over the frequency range Δf through numerical fit of the measurement points to a generated mathematical function, and for determining at least one of the geometric and optical parameters of the cavity by ascertaining the parameters of the generated mathematical function.

16. The device of claim 15, wherein the generated mathematical function is a sine function.

17. The device of claim 16, wherein the analyzing unit is configured to determine each of the parameters by matching a magnitude of the analysed frequency range Δf to each of the parameters and to the cavity.

18. The device of claim 15, for calibrating the frequency f of the tuneable-coherent light source comprising a gas cell filled with an absorption material, which absorption material exhibits an absorption line of a known frequency $f_R$.

19. The device of claim 15, comprising a reference interferometer of known length for calibrating the frequency f of the tuneable coherent light source.

20. The device of claim 15, wherein the tuneable coherent light source is a laser diode or a DFB laser diode.

21. The device of claim 20, wherein where a wavelength of the laser diode is tuneable electrically by regulating a control current or tuneable mechanically by changing a light path.

22. The device of claim 15, wherein the target interferometer is configured as a Fabry-Perot interferometer or as a Michelson interferometer.

23. The device of claim 15, comprising a detector for determining an amplitude of an intensity of the reference beam during a measurement cycle.

24. The device of claim 15, wherein the geometric parameters of the cavity comprise its length x, and the optical parameters of the cavity comprise at least one of its reflectivity and index of refraction.

* * * * *

UNITED STATES PATENT AND TRADEMARK OFFICE
CERTIFICATE OF CORRECTION

PATENT NO. : 10,627,210 B2
APPLICATION NO. : 16/078949
DATED : April 21, 2020
INVENTOR(S) : Björn Habrich Page 1 of 1

It is certified that error appears in the above-identified patent and that said Letters Patent is hereby corrected as shown below:

In the Claims

Column 11, Claim number 1, Line number 53, should read:
Analyzing a plurality of measurement points of the Column 13, Claim number 21, Line number 14, should read:
The device of claim 20, wherein a wavelength Signed and Sealed this
Ninth Day of June, 2020

Andrei Iancu
*Director of the United States Patent and Trademark Office*